United States Patent Office 2,983,619
Patented May 9, 1961

2,983,619

METHOD OF PREPARING PRESERVED FOOD PRODUCTS

Roy L. Shaw, Jr., Hopkins, Minn., and Ray W. Kueneman and James E. Conrad, Caldwell, Idaho, assignors to J. R. Simplot Company, Boise, Idaho, a corporation of Nevada No Drawing. Filed Oct. 20, 1959, Ser. No. 847,447

9 Claims. (Cl. 99—186)

This invention relates to an improvement in the preservation of white potatoes or Solanum tuberosum.

The potato product with which the present invention is concerned is in the form of relatively small whole potatoes and relatively large pieces of whole potato. That is, the product is either small whole potatoes, balls, or cut pieces such as cubes, sticks, slices, and similar products in which plural potato cells are in the same spatial arrangement, and remain interconnected in essentially the same manner as in the raw potato in which they originate. Where the term "potato solids" is used in the following specification and claims, the expression is intended to mean such potato products both in the form of whole potatoes or pieces thereof wherein there are plural cells arranged as described above.

Problems encountered in utilizing known raw or preserved potato products of this nature include variability in the raw material, off-flavor, difficulty in reconstituting preserved products to a form comparable to raw potato, discoloration, and expense in preserving and storing the products. Thus, fresh potatoes and fresh-frozen potatoes vary from season to season depending upon the source of the raw material and the length of storage. Such variability creates problems in obtaining a uniform end product. An important advance in preservation processes for potato pieces is a process of partially dehydrating the potato pieces, then freezing the material and storing it in the frozen form. In such prior process of partially dehydrating and freezing potatoes, the potato was dehydrated to a moisture content between 12% and 66%, then frozen. Difficulties encountered in the utilization of this prior process include such undesirable results as potato pieces difficult to rehydrate, portions of the potato pieces rehydrating to mushy, easily disintegrated material, or the occurrence of a "popcorn" effect, in which a hollow shell corresponding in shape to the original potato piece is obtained, the contents of the shell having been lost during processing.

This invention is in a method of using the product resulting from an improvement in such a process. The essence of this invention resides in the discovery that certain processing conditions and certain properties of the product are critical and essential to the successful production of a superior product.

An object of the invention is to provide a process of preparing canned or frozen potato-containing foods in which the potatoes are non-sloughing, utilizing the partially dehydrated frozen potato product described herein.

This and other objects which will be apparent are obtained by precooking pieces of potato for a time between about two minutes and thirty minutes at temperatures between about 140° and 212° F., to an extent such that enzymes causing discoloration of stored potatoes are inactivated, short of cooking the potato to the state of edibility, and to such an extent only that the potatoes are difficult to crush between the fingers. The potato solids, after precooking, have lost the raw texture and flavor, but are relatively hard as compared to fully cooked potato. The expression "precook" as used herein is thus intended to denote such partial cooking. After precooking, the potato solids are partially dried, prior to freezing, by controlled evaporative drying methods, to a moisture content such that all portions of the potato solids have more than about 40% moisture, followed by freezing and storing the product. After freezing, the potato solids are used for preparing preserved food products in accordance with the present invention as described below.

By "evaporative" drying methods is meant the evaporation of liquid water, and it is intended to exclude processes of dehydrating which involve freezing followed by removal of water either by sublimation of the frozen water or by thawing, and then utilizing a mechanical or evaporative method of removing the water from the thawed material.

It has been discovered that if certain precautions are followed in preparing ready to eat foods from the precooked, partly dried, frozen potatoes of this invention, the potato tissue does not slough during storage or reheating. In accordance with this aspect of the invention, it is found that the presence of free starch or starchy flour in aqueous suspension is essential in conferring the non-sloughing property. All prior preserved potato products, including frozen potatoes, and dehydrated potatoes slough after storage and/or reheating whether or not free starch is present. The result is particularly striking when potatoes of a given solids content are compared, and the partially dehydrated frozen product of the invention is superior even to fresh potatoes of comparable solids content. By "sloughing" is meant erosion of at least the surface portions of pieces of whole potato, as a result of disintegration of connective tissue between cells and the separation of potato cells and fragmentation thereof. The sloughed tissue often is present to such an extent that the aqueous liquid or gravy present acquires a grainy heterogeneous texture, losing its smooth texture.

The starchy materials useful in this invention are those commonly used in foods, usually derived from cereal grains, tubers, and roots, for example, those derived from wheat, corn, potatoes, and rice. As the term "starch" is used herein, starchy materials such as wheat flour are intended to be included. The starch may be waxy or not. Useful proportions are between about 1% and 3% or more by weight based on the amount of water present in the suspending medium, the upper limit depending upon the desired thickness of the liquid, sauce, gravy, etc. Consequently, the suspension may vary between a watery liquid and a thick sauce or gravy.

The starch is free, as distinguished from that enclosed in the cell envelope of natural vegetable tissue. The starch suspension is ordinarily heated prior to storing the prepared food, as in the preparation of gravy or in retorting the product. The product need not be completely immersed in the liquid; for example, potota salad made with mayonnaise may have in effect merely a thin coating of the liquid on the potato solids.

The precooked, partially dehydrated frozen product of the invention is in the form of potato solids in which the cells generally have the same spatial arrangement as in the raw potato and remain inter-connected by connective tissue between cell walls in a manner substantially the same as in the raw potato. The partially dehydrated frozen pieces are shrunken or smaller in size than the raw potato, the size being reduced in some cases to such an extent that the pieces occupy approximately half the volume of the original pieces of raw potato. Discoloring enzymes are inactivated, as a result of precooking, which as stated above is short of a complete cook but greater in extent than an ordinary surface blanch. A critical feature of the frozen product is that no part of the individual potato solid has more than about 68% water content, by weight, and no part of such solid has less than about 40% water, by weight.

As indicated in greater detail below, certain critical conditions in the process and critical properties of the product are important aspects of the invention.

The potatoes, preferably high solids, Idaho Russett Burbank variety, are first peeled and sliced. Other botanical varities of potato are useful, including Irish Cobbler, Triumph, Katahdin, Chippewa, White Rose, Green Mountain, Russett Rural, Sebago, Pontiac, and other similar varieties. While high solids potato, having a solids content of between about 21% and 25% are preferred, potatoes having a lower solids content, for example, between about 16% and about 21% are useful in the invention. Relatively large slices are useful in the invention; for example, slices 1″ x 1″ x ½″ yield an excellent product, as do relatively small whole potatoes of proportionately the same dimensions. The solids may be smaller in size, for example, having a maximum dimension of ⅜″, and may be in the shape of balls, cubes, sticks, or other forms. After slicing, or shaping where necessary, the potato pieces are precooked. For the precooking water is commonly used, although steam precooking or any combination of steam and water precooking, are useful. After precooking, the potatoes are conveyed to the evaporative dryer by any convenient means, including chutes, water-filled flumes, conveyor belts, and other means.

The dryer may be conveniently a hot-air continuous belt dryer, in which the air temperature at the potato inlet portion is between about 100° F. and 250° F., and in which the air temperature at the potato outlet end of the apparatus is within the same approximate range and is at a higher or lower temperature than the inlet end of the dryer. Utilizing this type of dryer, the potato solids remain therein for a period and under conditions required to attain the critical moisture content as herein specified. Whatever drying method is utilized it must be so controlled that no part of the potato solid falls below about 40% moisture and all portions of the potato solid are dehydrated to a moisture content of 68% and below. If the exterior of the partially dehydrated potato pieces contains less than the critical minimum about of about 40% water, the pieces are very slow to rehydrate, the exterior portions of the pieces remain tough even after rehydration, and other evidences of incomplete hydration appear. The color, flavor, and odor are often unsatisfactory under these conditions. If any portion of the potato has a moisture content greater than about 68% after completion of the evaporative drying, the cell walls and connective tissue between cells are apparently damaged in the freezing. Such portion of the potato upon rehydration is soft, watery, and may even be essentially a mushy liquid.

Within the critical range of moisture content of about 40% to about 68%, it is preferred that there be no more than approximately 8% to 12% difference in water content between the innermost and outermost portions of the discrete solids, for uniformity. Excellent products have been prepared in which the differential in water content is as much as 24%, however. The extreme of approximately a 28% differential also yields the superior product of the invention, as does the product having no substantial difference between the portions of individual pieces.

In discussing the moisture content of the potato solids or pieces herein, the expressions "parts" or "portions," having a moisture content between about 40% and about 68%, are used to denote incremental divisions of the solids or pieces. These parts or portions as the terms are used herein, delineate gradients or zones of moisture content; the shell portions of potato solids of this invention may have a lower water content than the core portions, for example. In establishing conditions in the dryer for obtaining the extent of dehydration which will avoid excessively dry and excessively moist portions in accordance with the teachings of this invention, individual pieces of partially dried potato are dissected to give two, three, or more parts, increments, or portions of approximately equal volume. The moisture contents of these outer and inner portions are determined and the drying conditions adjusted accordingly.

The potatoes or slices of potato need not be immediately frozen. Thus the partially dried material may be held for some time to equilibrate or to allow additional migration of moisture from the inner cells to the outer cells.

Although the precooking and partial drying steps are disclosed above as being conducted separately and in separate apparatus, they may be conducted in a single apparatus, wherein the precooking takes place in order to inactivate the enzymes quickly, followed by slower evaporative steps. The drying process may be conducted by any known evaporative method, including hot air, vacuum, direct dry steam, infrared heat, dielectric heat, and other drying methods which are efficient and do not damage the cell wall structure and do not disintegrate the connective tissue between cells. As indicated above, an example of a harmful drying method excluded from the scope of the present invention is that in which the raw potato is frozen prior to drying. Maintaining the potato at a temperature above that which will freeze the potato liquids, until the controlled partial drying is accomplished, is a precaution which must be followed in order to obtain a satisfactory product. The method of freezing the precooked and partially dried potatoes is not critical, and useful methods include both slow freezing and fast freezing processes. The particle size and the moisture content of the solid are of importance in relation to freezing conditions. Thus, relatively drier potato solid may be frozen under milder conditions or in a shorter time than larger solid of a higher total moisture content. Suitable freezing conditions include holding the material between −30° and −40° F. until frozen, which may take between about three minutes and about twenty minutes. The preceding temperatures and times are considered to be a fast freezing process, and an equivalent slow freezing method is to hold the partially dehydrated whole potato pieces at 0° F. for a time between about twenty minutes and two hours or longer. After freezing the product is stored at about 0° F., and the temperature is maintained below about 25° F. until the product is used. Because of the fact that the liquid constituent of the partially dehydrated potato material is a relatively concentrated solution, the potato pieces thaw at temperatures below the normal freezing point of water, and this should be taken into consideration when storing the product.

The frozen product consists of potato solids consisting of undamaged interior potato cells and undamaged connective tissue between cell walls, the starch grains within the cells being at least partially swollen or gelatinized, the natural enzymes having been inactivated to an extent that discoloring of the product during storage does not take place, the product being easily reconstituted, rehydrated, and cooked, and having a moisture content such that no part of the potato has more than about 68% water by weight and no part of the potato has less than about 40% water by weight. The product, whatever the nature of the starting material, is of relatively uniform quality, and has good color and flavor.

Useful reconstituting methods include those which directly restore the frozen product to a state similar to that achieved by the precooking, as well as those which provide a cooked product. The temperature of the aqueous liquid used may vary between about 145° and 212° F. If placed in hot (190° F.) water for about ¾ to 1 hour, the product is comparable to the potato solids prior to the dehydration step of the invention. An alternative method is to immerse the frozen or newly thawed material in water at between about 180° and 200° F. and simmer for 20 to 40 minutes. If soaked overnight the material may then be cooked and/or canned in a shorter time. When canned, a shorter reconstitution time is required because of the retorting of the canned material. The cooked pieces may be used in ready to eat foods, or in frozen prepared foods. If it is desired to avoid a separate reconstituting step the material with or without prior thawing, is placed in cans with or without other food products such as meats, vegetables or sauces, which cans are sealed and retorted. For example, using a 303 x 406 can, retorting from about 20 to 180 minutes at 200° to 260° F. is suitable.

A suitable mode of carrying out the invention is set forth in the following example.

Example 1

Potatoes of average processing solids content (22½%) were peeled, trimmed and diced into unit of ½" x 1" x 1" dimensions. These diced potatoes were water precooked at 172° to 178° F. for 10½ minutes to a previously established peroxidase enzyme standard. The precooked potatoes were dehydrated in a hot air continuous belt dryer at 175° F. in the first stage section and 165° to 170° F. in the second stage section for a total of one hour and 55 minutes.

The partially dehydrated pieces had a minimum outside moisture content of 44% and a maximum inside moisture content of 68%. The product was frozen for 11 minutes at −30° F. and after packaging stored at 0° F.

The drying section of the horizontal continuous belt of the dryer was seven feet wide by forty feet in length, with the heated air being passed upwardly through the belt for the first twenty feet and then downwardly through the last half of the belt. The potato bed was maintained at a depth of about 5½". The air velocity through the potatoes on the belt was 400' per minute, and at the inlet end of the dryer the dry bulb temperature of the air was 175° F. and the wet bulb temperature was 85° F.

Samples of this frozen product were placed in boiling water and simmered for 20 to 30 minutes. The resultant potato pieces had a good uniform texture and appearance throughout. Another sample was placed in a 303 x 406 can and the can filled with water and heated to 180° F. The can was sealed and retorted 75 minutes at 248° F., then cooled 30 minutes in tap water. On opening the can the potato pieces were very good in appearance and were very good in texture, flavor, and odor.

The following two examples illustrate processes and products outside the scope of the invention.

Example 2

A lot of potatoes were processed exactly as in the above example except that the dehydrator operated at 225° F. in the first section and 200° F. in the second section. The resulting moisture was 30% on the outer section of the potato piece and 67% moisture on the center section of the potato piece. When samples were cooked in the two ways mentioned above the pieces were slow to rehydrate and the exterior of each piece remained tough and in some cases showed evidence of incomplete rehydration. This example demonstrates that no part of the potato should be dried below about 40% moisture, even though other parts of the potato piece were higher than this 40% moisture.

Example 3

A lot of potatoes were processed exactly as in the above example except that the dehydrator was operated at 100° F. in the first section and 100° F. in the second section. The resulting moistures were 57% on the outer piece of the potato and 74% on the center piece of the potato. When two samples of the potatoes were cooked exactly as in the above example the pieces rehydrated fairly rapidly except that the centers of the pieces of potatoes were soft, watery and in some cases very mushy. This example demonstrates that no part of the potato piece should be above about 68% moisture although the remaining part of the potato piece could be below about 68% moisture.

While suitable piece sizes have been given above, it should be pointed out that smaller potato solids such as strings ⅛" x ⅛" x 2" are useful, as are larger pieces, for example 1⅛" cubes. The maximum particle size is limited primarily by the availability of drying processes capable of drying potato solids to the critical values of the invention. The peroxidase enzyme standard referred to in Example 1 is a well known procedure developed by the U.S. Department of Agriculture, and was used to quickly and easily evaluate the extent of precooking, since once the standards are established by organoleptic evaluations, control of the process is simplified.

The method described above for determining the moisture content of the parts, portions, or increments bears amplification. Thus, for Examples 1, 2 and 3 the thickness of the outer shell removed from the partially dried potato piece was approximately 1/32" to 1/16", and the center wafer removed was about ⅛" x ½" x ½". These increments were accumulated under non-drying conditions to obtain about 15 g. samples, upon which moisture determinations were made. Similar procedures were used for potato solids of other shapes and sizes.

Example 4

Small whole peeled potatoes, generally spherical in shape, between about ⅞" and 1" in diameter, when processed under a procedure similar to that of Example 1 to obtain an outer shell moisture of 40% and an inner core moisture of 65%, yields superior products according to the invention, after freezing at −30° F. and reconstituting as in Example 1.

The following two examples illustrate suitable modes of obtaining the non-sloughing prepared food products of the invention.

Example 5

Partially dehydrated frozen potatoes ½" x 1" x 1", containing a shell moisture of about 68% and a core moisture of about 44%, were placed in a 303 x 406 can and covered with solutions or suspensions of corn starch, potato starch, and wheat flour. The starch or flour and water were heated to approximately 180° F. before addition to the can. The cans were sealed and retorted for 75 minutes at about 246° F., then cooled, opened, and drained, with the following results.

| Starch | Starch, Weight Percent (based on H₂O) | Results | |
|---|---|---|---|
| | | Sloughing | Texture and Quality |
| Corn | 1 | Slight | Acceptable. |
| | 2 | None | Excellent. |
| | 3 | ___do___ | Do. |
| | 4 | ___do___ | Do. |
| Potato | 1 | Slight | Acceptable. |
| | 2 | None | Excellent. |
| | 3 | ___do___ | Do. |
| | 4 | ___do___ | Do. |
| Wheat Flour | 3 | ___do___ | Do. |
| Water Only | | Appreciable | Soft, unacceptable. |

Similar canned products stored for about one year and then opened, were found to have essentially the same properties.

Example 6

An embodiment of the process for obtaining non-sloughing prepared frozen foods is illustrated by this example.

Frozen ½" potato cubes with no portion thereof having more than about 68% moisture nor less than about 40% moisture, by weight were partially rehydrated from the frozen state by soaking in 190° F. water for 20 minutes. After draining, these potatoes were added to a white sauce (1 part potatoes, 2 parts sauce) containing the following ingredients:

> 1 cup melted butter
> 1¼ cups wheat flour
> 4 teaspoons salt
> ½ teaspoon white pepper
> 2 quarts warm skim milk The potato and milk sauce mixture was added to a "boilable" bag, frozen, and then prepared for serving by heating the bag and contents in boiling water for 14 minutes. This completed the rehydration and cooking.

The ready-to-eat potato cubes remained firm and without evidence of sloughing.

The freezing of prepared foods such as in Example 6 may be either slow or fast.

We claim:

1. In a process of preparing preserved food products containing cooked white potatoes, balls, pieces, slices and like potato solids, which comprises the steps of partially cooking such potato solids by subjecting said solids to heat at a temperature between about 140° and about 212° F. for a time which inactivates enzymes in the potato solids, the time being such that said potato solids have lost the texture and flavor of raw potato but without cooking said potato solids to the state of edibility, partially drying said partially cooked potato solids, by the controlled evaporative removal of moisture therefrom, said partial drying being such that no portion of said solids has less than about 40% of water nor more than about 68% of water, each by weight, and freezing and utilizing said partially dried solids, the improvement which comprises at least partially rehydrating and at least partially cooking said solids in the presence of water and preserving said rehydrated and cooked solids in a sealed container and in the presence of an aqueous suspension of starch.

2. The process of claim 1 in which the said rehydration and cooking of said solids is in the presence of an aqueous suspension of starch and within said sealed container.

3. The process of claim 1 in which said frozen partially dried solids are thawed and then rehydrated and cooked before preservation thereof.

4. The process of claim 1 in which the aqueous starch suspension has at least about 1% starch based on the weight of the water in the suspension.

5. The process of claim 1 in which said frozen, partially dehydrated potato solids are at least partially rehydrated with hot water, mixed with a substantial proportion of an aqueous starch suspension containing at least 1% of starch based on the water in the suspension, the mixture is placed in said container, and the container is sealed, processed and stored.

6. The process of claim 5 in which the container contents are frozen.

7. The process of claim 2 in which the aqueous starch suspension has at least about 1% starch based on the weight of the water in the suspension.

8. The process of claim 3 in which the aqueous starch suspension has at least about 1% starch based on the weight of the water in the suspension.

9. In a process of preparing and preserving foods comprising potatoes, which process includes the steps of cooking potato pieces, balls, slices, whole potatoes, or like potato solids, and which are incorporated in said foods and preserved in a suspension comprising water and starch, the improvement comprising thawing rehydrating and cooking frozen potato solids in which frozen material the heat-sensitive enzymes have been inactivated, said frozen solids having been precooked to a state short of edibility and in which the starch grains within the cells are at least partially gelatinized, no part of said frozen potato solids having a moisture content of less than about 40% nor more than about 68%, the moisture differential between the innermost and outermost portions of said frozen potato solids being less than about 12%, and preserving said thawed, rehydrated, and cooked potato solids in a suspension comprising starch and water in which there is at least about 1% starch, based on the weight of the water in the suspension, whereby sloughing of said cooked potato solids during storage and processing is inhibited.

References Cited in the file of this patent

UNITED STATES PATENTS

| 2,364,049 | Bensel | Dec. 5, 1944 |
| 2,419,877 | Birdseye | Apr. 29, 1947 |
| 2,477,605 | Howard et al. | Aug. 2, 1949 |
| 2,523,552 | Birdseye | Sept. 26, 1950 |